United States Patent Office 3,751,525
Patented Aug. 7, 1973

3,751,525
GASKET-FORMING COMPOSITIONS
Mannie Brenner, 393 Broadway, Cambridge, Mass. 02145; Fred L. Chase, 30 Lake Shore Drive, Arlington, Mass. 02174; and Arthur J. Leydon, 587 Lexington St., Waltham, Mass. 02154
No Drawing. Filed Sept. 28, 1970, Ser. No. 76,268
Int. Cl. C08f 19/06, 41/04
U.S. Cl. 260—880 B
4 Claims

ABSTRACT OF THE DISCLOSURE

The oxidation resistance of gasket-forming compositions containing a thermoplastic styrene-butadiene-styrene type block copolymer is enhanced by incorporating into them, in addition to conventional quantities of N,N'-dinaphthyl-p-phenylenediamine, a small percentage of calcium, magnesium, zinc or aluminum oxide.

THE PRIOR ART

Compositions containing natural or synthetic rubber dispersed or dissolved in a volatile organic solvent have found wide acceptance in the manufacture of "flowed-in" gaskets for container closures. In preparing these gaskets, a band of the fluid composition is deposited through a nozzle into the sealing area of the closure. Thereafter, the deposit is converted into a solid sealing mass by drying and, in some cases, subsequent curing.

In addition to rubbers and volatile organic liquids, the gasket-forming compositions of the art contain relatively large quantities of filler and occasionally, when desired, a curing agent. Functions of this filler include modification of the flow characteristics of the fluid composition, toughening and hardening of the gaskets, increase of abrasion and tear resistance, and improved performance with respect to oxidation, moisture, solvents and certain chemicals.

The improvement of filled rubber composition has also been favored by the employment of rubber compounding techniques to produce, in concert with the proper selection of fillers, stable non-settling or fully redispersible compounds which could not be obtained by simple mixing techniques. The relative stability of such compositions not only facilitates their redispersion when necessary before use, but also frees the high speed closure lining operation from interruptions caused by nozzle clogging due to aggregated materials.

The rubbers that have conventionally been used in this type of composition are strictly elastomeric in properties and have thus lent themselves to rubber handling techniques. Other rubbers such as block copolymers of styrene with butadiene, on the other hand, have posed problems in banbury mixers and rubber mills because of their thermoplasticity which causes them to adhere to the blades and walls of the equipment. These problems, however, have been solved by the incorporation of special ingredients into the formulations and by appropriate adjustment of the ingredient proportions.

An object of the present invention has been to improve the oxidation resistance of butadiene-styrene type block copolymer gasket-forming compounds in order to increase their utility in commercial operations.

SUMMARY OF THE INVENTION

It has now been discovered that the incorporation of small quantities of certain metal oxides into the styrene-butadiene or styrene-isoprene block copolymer compositions, in addition to the conventional N,N'-dinaphthyl-p-phenylenediamine antioxidant, dramatically increases the oxidation resistance of the gasket-forming compounds, thus conferring upon them the desired degree of increased utility.

The metal oxides that achieve this improvement are those of calcium, zinc, magnesium and aluminum, when used at a level of about 0.08 to 0.25 molecular weight parts per 100 parts of rubber by weight in conjunction with about 0.5 to 3.0 parts of the organic antioxidant.

DETAILED DESCRIPTION

The compositions of this invention as well as the method employed to prepare them are represented by the following examples. These examples are given for illustrative purposes only and are not intended to limit the invention beyond the scope of the claims following this specification.

Example 1

A control sealing composition is prepared with the following ingredients in the proportions indicated:

| Ingredient: | Parts by weight |
|---|---|
| (1) Styrene-butadiene block copolymer | 81.0 |
| (2) Styrene-butadiene random copolymer | 27.0 |
| (3) Polyisobutylene | 13.5 |
| (4) Carbon black masterbatch | 1.1 |
| (5) Polyethylene | 20.2 |
| (6) Polyethylene glycol | 2.2 |
| (7) N,N' - di - β - naphthyl - p - phenylenediamine | 4.1 |
| (8) Titanium dioxide pigment | 21.6 |
| (9) Resin (ester gum) | 40.5 |
| (10) Calcined clay, sp. gr. 1.8 | 142.8 |
| (11) Styrene-butadiene block copolymer | 148.6 |
| (12) Resin (ester gum) | 310.4 |
| (13) Isoheptane (to 54% solids) | |

The block copolymer used here is of the polystyrene-polybutadiene-polystyrene type. It has a total molecular weight of about 100,000 with a distribution of about 14,000–74,000–14,000 among the three constituent polymeric segments. The random styrene-butadiene copolymer is that classified as SBR 1011 by the International Institute of Synthetic Rubber Producers. It is a hot polymerized copolymer having a Mooney viscosity of 54 (ML–4 min. at 212° F.) and containing about 23.5% bound styrene. The polyisobutylene is a medium molecular weight solid with a viscosity average molecular weight (Staudinger) of approximately 70,000. The carbon black masterbatch consists essentially of a blend of 20 parts of carbon black with 80 parts of a random styrene-butadiene copolymer of a type similar to that already described.

The non-rubber ingredients are characterized as follows. The polyethylene is a material with a molecular weight of about 7,000, a ring-and-ball softening point of about 106° C. and a saponification number of 5.0. The polyethylene glycol is a high molecular weight material having a viscosity of about 3700 Saybolt seconds at 210° F. The ester gum employed is a standard glycerol ester of tall oil rosin having a melting point of 89 to 92° C., a specific gravity of 1.095 and an acid number of 7. The calcined clay is a low specific gravity white aluminum silicate having an average particle size of 1 micron, a bulking value of 0.0666, a screen residue (wet) of 0.009 at 200 mesh, a pH of 4.3 and a refractive index of 1.625. The other non-rubber components of the formulation are conventional materials for this type of application and need no further description.

The above described ingredients are mixed together by standard rubber compounding techniques. To accomplish this, ingredients 1 through 10 are placed in a Banbury mixer operated at high speed, ram down, with cooling water. After about 1.5 to 3 minutes, the mixture is dumped out at a temperature of 270° F. The mass is then milled on a two-roll rubber mill for a period of five minutes. The sheet obtained is chopped and fed to the solvent mixer where the rest of the block copolymer and resin (items 11 and 12 of the formula) are added and mixed in with the isoheptane.

Examples 2 to 5

Rubber dispersions are prepared as in Example 1 except that there is incorporated in the mix a certain quantity of metal oxide, namely 18.9 parts by weight of calcium oxide (Example 2), 13 parts of magnesium oxide (Example 3), 23.2 parts of zinc oxide (Example 4) and 33 parts of aluminum oxide (Example 5).

The resulting gasket-forming compounds are applied as films to tin plated steel panels and the panels are kept at 240° F. until aging of the film has occurred. This deterioration process is judged by observing the formation of cracks, discoloration and resinification of the films as they lose their rubber consistency. The time required for completion of the process is recorded.

On testing the formulations described in the examples, the following observations can be made.

| Example | Oxide | Aging progress at 240° F. after— | | | |
|---|---|---|---|---|---|
| | | 24 hrs. | 48 hrs. | 72 hrs. | 96 hrs. |
| 1 | None | Poor | Aged | | |
| 2 | CaO | Excellent | Good | Good | Good. |
| 3 | MgO | do | Excellent | do | Do. |
| 4 | ZnO | Good | do | do | Do. |
| 5 | Al$_2$O$_3$ | do | Good | do | Do. |

As shown in the above table, the oxidation resistance of gasket-forming compounds containing one of the metal oxides is strikingly superior to that of compounds in which there is present only the naphthylphenylenediamine. Without an oxide, the compound loses most of its rubberiness after only 24 hours, even in the presence of the organic antioxidant, while, in contrast, compounds also containing a metal oxide still retain usable sealing properties after 96 hours of exposure to damaging conditions.

In assessing this performance, it should be pointed out that gasket-forming compounds not containing any organic antioxidant age very rapidly, whether or not a metal oxide is incorporated into the formulations.

The behavior of the gasket-forming compounds of this invention is all the more surprising in that no such aging resistance could be induced by incorporating the same oxides into compounds containing any of several conventional organic antioxidants other than the naphthylphenylenediamine in the present invention.

The gasket-forming compositions that can be improved by the oxide-naphthylphenylenediamine system disclosed can further be described in the following manner.

The block copolymers of which they are made consist of polystyrene segments tacked onto a polybutadiene or polyisoprene core. A molecule of such compound can be represented as A—B—A wherein B is the polybutadiene or polyisoprene core and A stands for a polystyrene fragment. These elastomers possess a gradation of properties ranging from those of relatively homogeneous polystyrene to those of relatively homogeneous diene polymer. The block copolymers of interest here are those containing sufficient polybutadiene or polyisoprene to behave as elastomers at ambient temperatures, when the polystyrene segments are physically crosslinked, and sufficient polystyrene to become thermoplastic at high temperatures through the breaking of the physical crosslinking bonds. In practice, useful block copolymer may have a polystyrene content of about 10 to 50% by weight, an average polybutadiene or polyisoprene segment molecular weight within the range of about 25,000 to 300,000 and an average molecular weight of about 5,000 to 50,000 for each polystyrene segment. The preferred copolymers contain about 25 to 30% polystyrene by weight and have a molecular weight of about 60,000 to 160,000. The preparation of the block copolymers just described can be found in various patents including U.S. Pat. 3,231,635 and British Pat. 1,000,090.

The random butadiene-styrene copolymer of the present formulations can be any elastomeric random copolymer of styrene and butadiene conventionally used in gasket-forming compositions. The preferred materials are of the hot polymerized type, have a Mooney viscosity within the range of 35 to 75 and contain from about 20 to 40% bound styrene.

The polyisobutylene used is of the medium molecular weight type having a viscosity average molecular weight (Staudinger) within the range of about 60,000 to 145,000, with the preferred range being about 60,000 to 85,000.

The rubber components that have just been described are used in proportions such that the block copolymer is the major component and the random styrene-butadiene copolymer and the polyisobutylene each constitutes at least about 5% of the total rubber present. These proportions are not adjusted for the very minor quantity of random copolymer that may be introduced when carbon black is added as one ingredient of a masterbatch.

The compositions of the invention are formed by admixing with the rubber up to about 200 parts by weight of non-rubber additives for each 100 parts of rubber. This figure does not include the solvent added at the end of the entire operation in a quantity sufficient to achieve the solids concentration desired.

A low molecular weight polyethylene is used in quantities within the range of about 6 to 15 parts per 100 parts rubber. An acceptable material of this type has already been described in Example 1. About 10 parts of a polyethylene glycol per 100 parts of rubber may also be added as in Example 1.

The selection of particulate inorganic substances for the improved compositions has a certain importance depending on the composition characteristic desired. The preferred materials, which will render the compositions non-settling, possess a specific gravity within the range of about 1.8 to about 2.3. Their other properties need not differ from those of conventional rubber fillers. The preferred fillers include anhydrous aluminum silicates produced according to U.S. Pat. 3,021,195 by a method which removes the bound water of the natural product. From about 35 to 55 parts of such substances is needed per 100 parts rubber. Other inorganic filling materials can also be added for various reasons to affect the density of the compositions and their appearance as well as other physical and chemical properties. Suitable fillers, pigments and opacifiers which may be employed with or in the place of the preferred low specific gravity clay, include such widely used materials as water washed clays, anhydrous particulate silica, carbon blacks, titanium dioxide, hydrated calcium silicate, as well as any of the four metallic oxides which are the key to this invention, in quantities greater than those required by the invention. In other words, it is contemplated that magnesium oxide, aluminum oxide, zinc oxide and calcium oxide may be used in quantities larger than those necessary to increase the oxidation resistance of the gasket compounds, but such excess loading will presumably function as filler material. The dual nature of the block copolymers used in the present compositions confers upon them a great affinity for a variety of resins which generally would be compatible with either polystyrene or polybutadiene. In such circumstances, any resin normally used with closure sealing rubber compositions can be used here and in quantities ranging from about 30 to 200 parts per 100 parts rubber. Solid rosin esters having a melting point within the range of 80 to 120° C. are preferred.

Other minor conventional ingredients may also be incorporated into the compositions of the invention. Among these figure most prominently antioxidants and curing agents. Antioxidants which may be used in addition to the necessary naphthylphenylenediamine belong to classes of compounds as varied as the diaryldiamines, the bisphenols and the phosphites. Examples of suitable members of these and other useful classes include 1,3,5-trimethyl - 2,4,6 - tris(3,5-ditertiarybutyl-4-hydroxybenzyl) benzene, polymerized trimethyldihydroquinoline, 4,4'- methylenebis(2,6-ditertiarybutyl phenol), 2,2'-methylenebis(4 - methyl-6-tertiarybutylphenol), zinc dibutyldithiocarbamate, butylated hydroxyanisole, 4,4'-butylidenebis-(6-tertiarybutyl - 3 - methylphenol), trinonylphenylphosphite, polymerized trinonylphenylphosphite and tri(mixed mono- and dinonylphenyl) phosphite. Furthermore, there may be added to the compositions in the event that irreversible chemical crosslinking of the polybutadiene segments of the block copolymers is desired, any of the usual vulcanizing agents including such substances as sulfur, heat reactive phenolic resins, p,p'-dibenzoylquinonedioxime, 4,4'-dithiodimorpholine, aliphatic polysulfide polymers, tetrachlorobenzoquinone and the like.

As to the nature and the quantity of liquid that must be employed to complete the formulation, that must vary somewhat with the particular formulation devised and with the use intended, especially the type of machine and drying conditions employed in the ultimate application. In general, the selected liquid should constitute from about 25 to 70%, and preferably about 40 to 60%, of the total weight of the composition. Suitable liquids are those which act as good vehicles for the system and leave no objectionable residue on evaporation under the coating conditions. The list includes benzene, toluene, xylene, ethyl acetate, methyl ethyl ketone, acetone, hexane, isoheptane, octane as well as various mixtures of these liquids.

It is apparent from the foregoing partial enumeration of additives that a great variety of formulations can be designed for closure sealing compositions and for other sealing or coating applications without departing from the concept of the present invention as defined by the following claims.

What is claimed is:

1. An improved gasket-forming composition comprising a thermoplastic block copolymer of the A—B—A type in which B stands for a polymerized core of butadiene or isoprene having a molecular weight within the range of about 25,000 to 300,000, and A is a polystyrene chain having an average molecular weight of about 5,000 to 50,000, wherein the total polystyrene constitutes from about 10 to 50% of the polymer on a weight basis, and on the basis of 100 parts by weight total rubber in the composition, about 0.5 to 3.0 parts N,N'-dinaphthyl-p-phenylene diamine with about 0.08 to 0.25 molecular weight parts of an oxide selected from the group consisting of calcium, zinc, magnesium and aluminum oxides.

2. The composition of claim 1 where the block copolymer contains about 25 to 30% polystyrene by weight and has a molecular weight within the range of 60,000 to 160,000.

3. The composition of claim 1 wherein the block copolymer constitutes at least 50% by weight of the total rubber present.

4. The composition of claim 3 wherein about 1.5 parts of the phenylene diamine is used in conjunction with about 0.1 molecular weight parts of oxide per 100 parts rubber by weight.

References Cited
UNITED STATES PATENTS

| | | | |
|---|---|---|---|
| 2,767,152 | 10/1956 | Bierman et al. | 260—45.9 |
| 3,030,346 | 4/1962 | Cooper | 260—880 B |
| 3,325,430 | 6/1967 | Grasley | 260—880 B |

JAMES A. SEIDLECK, Primary Examiner

U.S. Cl. X.R.

260—31.2 MR, 32.8 A, 33.6 A, 41.5 R, 45.7 R, 876 B